United States Patent [19]
Norkus

[11] Patent Number: 4,484,775
[45] Date of Patent: Nov. 27, 1984

[54] ADJUSTABLE SMOOTH ACTION LINKAGE GRIPPER MECHANISM

[75] Inventor: George E. Norkus, Macomb County, Mich.

[73] Assignee: The United States of America as represented by the Secretary of the Army, Washington, D.C.

[21] Appl. No.: 410,214

[22] Filed: Aug. 23, 1982

[51] Int. Cl.³ .............................................. B25J 15/00
[52] U.S. Cl. ....................................... 294/88; 269/27; 269/228; 269/238; 269/239; 294/86 R; 294/104; 294/106; 901/36; 901/37
[58] Field of Search ................... 294/86 R, 88, 93, 97, 294/103 R, 104, 106, 111, 115, 117, 118; 269/27, 34, 228, 238, 239; 901/31, 36, 37, 39

[56] References Cited

U.S. PATENT DOCUMENTS

| | | | |
|---|---|---|---|
| 900,856 | 10/1908 | Jecklin et al. | 294/88 X |
| 1,619,749 | 3/1927 | Murray | 269/228 X |
| 2,103,074 | 12/1937 | Gardner | 269/228 X |
| 2,600,584 | 6/1952 | Snell | 269/228 X |
| 3,807,719 | 4/1974 | Williamson | 269/34 |
| 4,268,217 | 5/1981 | Perreault et al. | 294/104 X |

*Primary Examiner*—Johnny D. Cherry
*Attorney, Agent, or Firm*—Peter A. Taucher; Gail S. Soderling; Robert P. Gibson

[57] ABSTRACT

A rotatable lever and an initially transversely disposed adjustable linkage mechanism for attachment in predetermined relation to at least one movable work-performing arm and operable such that upon rotation of the lever and linkage mechanism responsive to pivotal rotary movement of the lever portion thru a designated travel arc of at least approximately 90°, the movable arm moves much more rapidly during the first approximate one-half to three-quarters of its designated travel arc, and thereafter continues to move progressively slower in a firm positive manner thru the remainder of the travel arc, while moving from its transverse relationship to a generally parallel or linearly aligned relationship. This simplified mechanism is non-servo in character and relatively low cost compared to servo devices embodying continuous sensing and feedback circuitry. Among various uses are easy association with various known industrial type robot devices embodying programmed control of articulated mechanical arms. This new mechanism preferably includes a reversible electric motor for rotating the actuating lever, and also includes either manual or similar reversible motor-actuated, adjustable linkage mechanism interconnected therewith to vary the mechanical advantage, relative travel distance and speed of the lever-linkage mechanism and one or more actuating arms. This adjustment feature facilitates this assembly's cooperation with different size/type workpieces, including handling of fragile items.

9 Claims, 7 Drawing Figures

ADJUSTABLE SMOOTH ACTION LINKAGE GRIPPER MECHANISM

GOVERNMENT INTEREST

The invention described herein may be manufactured, used, and licensed by or for the Government for governmental purposes without payment to me of any royalty thereon.

BACKGROUND AND SUMMARY OF THE INVENTION

This invention relates to a simplified interconnected lever and adjustable linkage mechanism adaptable for attachment in predetermined relation to one or more work performing actuating arms connected to a support member therefor. Because of its non-servo character, it can readily and less expensively expand potential use of basic robotic-operated mechanisms.

Robotics are fast becoming an integral feature of manufacturing and research in areas which it is costly, hazardous, or inefficient to use human personnel. In useful application, robotics mimic humans in that they are designed to do many of the same functions which human workers might do. Many of the robotics presently in use in manufacturing and research are designed to have articulated members resembling human arms with elbows, wrists and gripper elements which function similar to their human counterparts. However, the present robotics gripper elements have proven to be very expensive because of their complex nature. Heretofore, in order to allow for an adjustable grip to accommodate work articles of different size and composition, costly servo-mechanisms have been designed into the robotics systems which increase their overall price and therefore limit their availability. For purposes hereof servo-mechanisms are deemed to be those more complex devices which embody continuous sensing and feedback circuitry to continuously monitor the position of the related articulated arm and gripping components, or similar articulated components without grippers.

It is a principal object of the present invention to provide a relatively low cost, simplified, mechanical linkage for operating the gripper or other work performing arm elements adaptable for use in a generally non-servo-manner, either for internal or external gripping/tripping needs and actuatable either mechanically or hydraulically, thus increasing the affordability of robotics. This is achieved by mechanically adjustable, pivotally interconnected lever and linkage members mounted on the end of a known articulated arm system. These members may include various types of work-performing arms such as holding jaws or gripper arm elements which by means of the novel arrangement of lever-linkage means herein are adapted to move toward or away from each other relatively quickly when initially distally related to a workpiece to be gripped, but which arm or jaw elements then move progressively slower and more firmly after reaching a proximate relation to the workpiece.

DETAILED DESCRIPTION OF A PREFERRED EMBODIMENT

Figure 1:
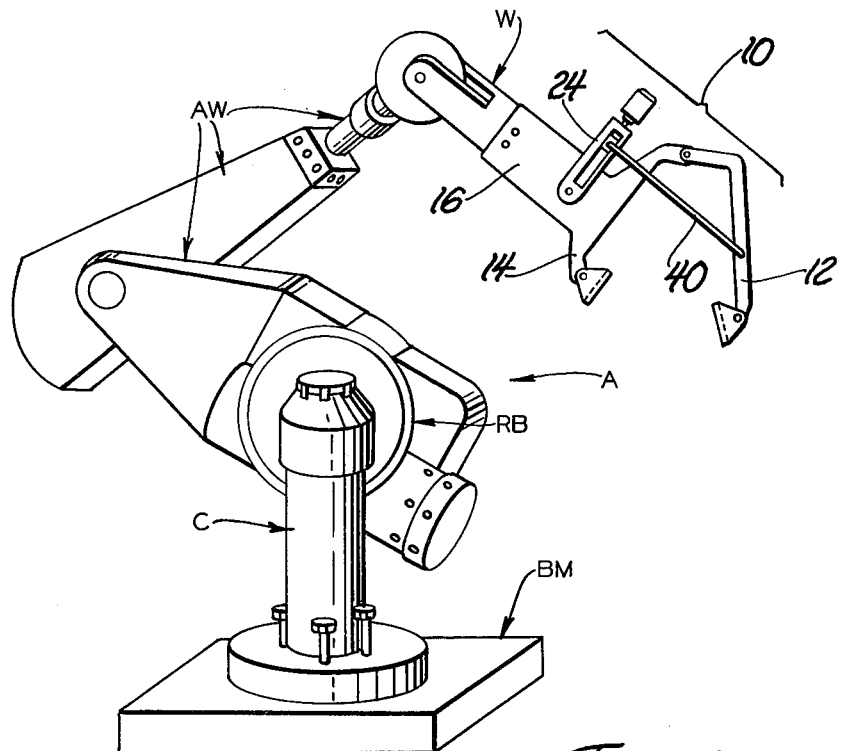
FIG. 1 depicts an elevational perspective of an exemplary basic robotics system which is equipped with one form of the present linkage mechanism invention.

Referring now to FIG. 1 of the drawings, the illustrative overall assembly of one form of a robotic apparatus is designated A, and includes a robot body RB pivotally supported on an upstanding rotatable column C attached to a suitable base member BM. The robot body RB is swingably mounted so as to have freedom of movement about the column's axis along a wide circular arc. Pivotally mounted on robot body RB is an articulated arm and wrist subassembly AW. Except for the new simplified mechanical linkage and gripper element subassembly designated 10 which is suitably mounted on the outer free end of subassembly AW, the rest of the robotic system may be of a type manufactured for various industrial uses by such companies as Cincinnati Milacron, Machine Intelligence Corp. (MIC), Automatix Inc., and Unimation. These are among various well known companies mentioned in an article entitled "How Smart Robots are Becoming Smarter" which appeared beginning on p. 32 of the publication titled *High Technology,* September/October 1981 issue. The various internal servo motors, related circuitry and specific construction details of the basic robot assembly are not shown herein because they do not per se form a part of the subject invention.

Figure 2:
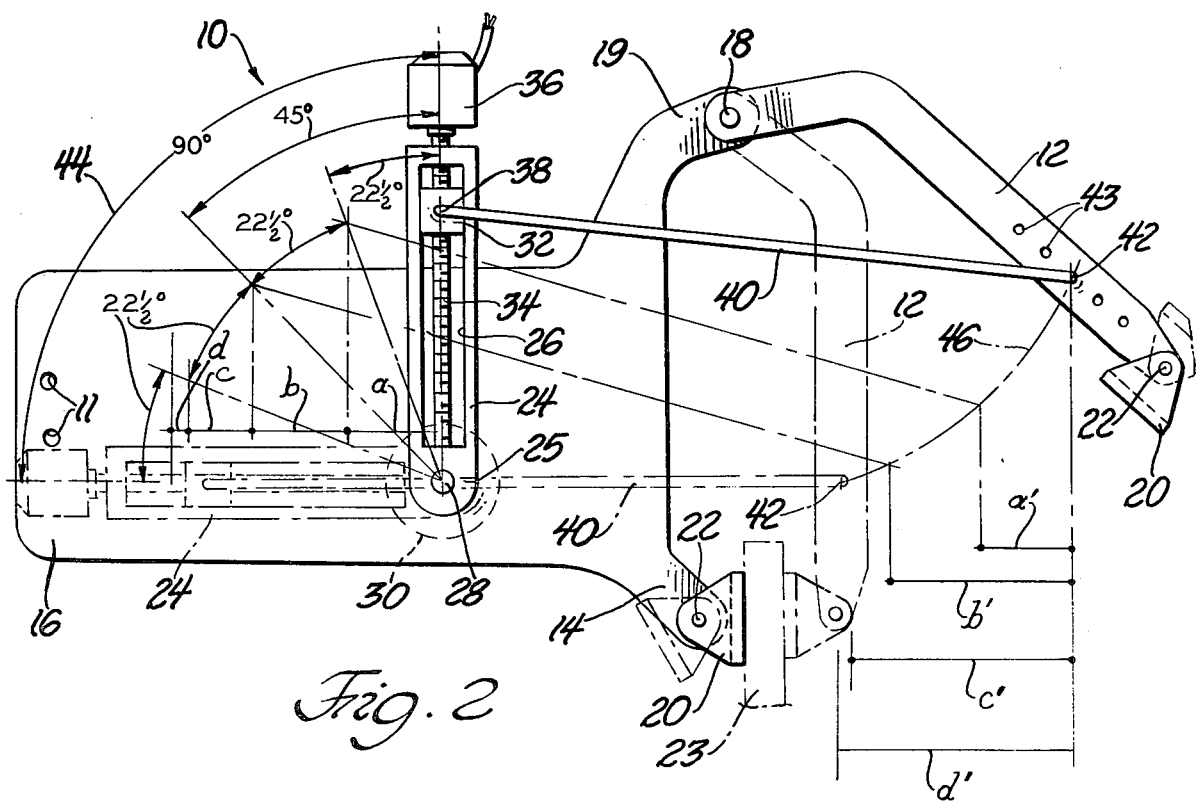
FIG. 2 is a top plan view showing on an enlarged scale the illustrative form of gripper mechanism as shown on the end of the articulated arm of FIG. 1.

It is understood that the arms of subassembly AW will have freedom of movement over a wide range as does the wrist assembly thereof, both of which are designed to have approximately the same motion as a human arm and wrist. The gripper subassembly 10 is suitably mechanically attached to wrist W, and may have two or more of movable gripper arms as needed to accomplish a wide range of functions. As shown in FIGS. 1 and 2, there is one pair of gripper arms comprising one movable arm 12 and one relatively immovable gripper arm 14. The movable gripper arm or jaw 12 is equipped with an actuating lever and linkage to be described which, when actuated, causes the gripper arm 12 to close relative to arm 14. This is shown in greater detail in FIG. 2.

As seen in FIG. 2, the gripper subassembly 10 may be provided with bracket/mounting holes 11, 11 at one end of a gripper base plate member 16 to which the gripper arm portion 14 is preferably integrally attached or formed. Said movable gripper arm 12 is swingably attached thereto and movable about a suitable pivotal connection 18. It is understood that in other embodiments, both arms may be made movable about one or more pivots. Continuing with the form depicted in FIG. 2, as illustrated, pivot connection 18 is formed in the free end of another arm portion 19 projecting from an opposite part of base plate member 16, although the base plate may, if desired, be of a different shape unitarily embodying the pivot point in a manner not having a pronounced arm portion. Each gripper arm or jaw may be equipped at its free end with generally identical gripper pad subassemblies 20. These are pivotally mounted at respective pivot points 22 so that the respective generally planar faces of the pads can assume relatively co-planar and other universal type intermediate relationships for gripping a wide range of different sized and shaped work articles such as 23. Alternatively, the pivot points 22 can be made of a universal ball joint character, and the pad faces may be concave or of other appropriate configuration as goods to be handled dictate.

It is desirable that gripper arm 12 be movable about pivot 18 in a smooth adjustable manner so that the grippers may be used to effect gentle handling of fragile as well as high strength work articles. Movement of arm 12 is achieved by the following combination of interrelated levers and linkage members. An elongated lever 24 having a longitudinal slot 26 is pivotally mounted upon and for movement parallel to the major plane of plate member 16. The mounting of this actuating lever 24 is at one end thereof, the lower end 25 as depicted in FIG. 2, which is suitably attached preferably to rotatable motor shaft 28. Shaft 28 projects through a clearance hole or a bearing (not shown) in plate 16 at essentially 90°. Shaft 28 is preferably an integral part of a first reversible actuator or drive motor 30 used to change the angular relationship of lever 24 to the other members to be described. Lever 24 also carries link-adjustment means in the form of an adjustable nut member 32 which is nonrotatively movable partially within said slot 26 and along an elongated, complementally threaded rotatable screw rod 34. Screw rod 34 may be supportingly journaled upon lever 24 or more preferably within its said slot 26 and with the axis parallel to or coplanar with the major plane of lever 24. Said rod 34 may be manually crank or finger-dial turned, or more preferably is further operatively connected preferably at one end to a second smaller reversible drive motor 36 which also is suitably supported upon the lever 24 or cantilevered on shaft/rod 34, as shown. Part of the nut member 32 projects into and is guided along said slot 26 of lever 24. An opposite, outward portion of the nut member 32 provides a pivotal connection point 38 for one end of a link member 40, the other end of which is pivotally connected at 42 to a generally medial part of the movable gripper arm 12. Arm 12 may be provided with a plurality of adjustment holes 43, if desired.

Still referring to FIG. 2, it will be seen that when the motor 36 is energized to rotate shaft 34 the adjustment nut 32 will be moved along screw rod 34, to selectively vary the effective moment arm of lever 24 about pivot shaft 28. In the position shown in FIG. 2, with the nut 32 essentially at the extreme outer position (away from pivot 28), its near maximum potential moment is attained. Thus, upon energization of motor 30 to effect rotation of lever 24 leftward (or rightward for effecting internal gripping of an object) along arcuate path 44 toward the dotted 90° removed position, the link member 40 will effect closing of arm 12, during which it will move more quickly with less force during the first and major part of its closing travel toward the relatively immovable gripper arm 14; and, as the lever 24 more closely approaches the dotted line position at approximately 90° relative to the solid line position, gripper arm 12 will move more slowly and firmer as the pads 20, 20 approach each other. In the illustrated form of FIG. 2, the 90° travel is shown divided into approximately four equal segments of $22\frac{1}{2}°$. From a comparison of the parallel lines drawn perpendicularly from the axis line of the 90° displaced position, up through an exemplary arc of travel, the points of intersection can be readily seen. The respective corresponding increments of linear travel are denoted a, b, c, and d (FIG. 2). As can be seen, the amounts of travel for increments a and b are essentially identical; and, the increment denoted c is approximately $\frac{5}{8}$ (or about 66%) of that of a and b, thus signifying the beginning of the slower and firmer movement of arm 12. The much smaller increment d (approximately 16% of a and b) confirms the desired slower and more firm final travel of arm 12 toward its closed position. It should be noted also that the pivotal connecting points 38 and 42, the latter on arm 12, preferably become essentially aligned with the center of the lever's pivot point/shaft 28 when arm 12 moves to its closed position. The arc of arm 12 travel designated 46 (FIG. 2) is also shown similarly intersected by similar lines corresponding to those delineating the aforesaid increments a, b, c, d for the lever 24 in the lefthand side of FIG. 2. These corresponding linear travel increments are designated a', b', c' and d'.

To release the grip of the jaws, drive motor 30 is reversed to rotate lever 24 back to its original solid line position. During this movement, after initially slow and careful release of the workpiece, arm 12 thereafter moves more quickly to its fully open position.

Therefore, it is apparent that by adjusting the linkage and lever mechanism, the movable gripper arms' stroke or span is adjustable so that its travel speed and its gripping force can be selectively modified. Thus, the various mechanisms are preferably constructed so that the effective length of the link can be selectively varied to increase or decrease the span between pads 20, 20 to thereby handle a variety of different size articles. The motor 30 is presumed to be of a constant speed character to apply uniform grasping force.

As briefly stated hereinabove, the mechanism is adaptable to also internally grasp an article, in which event the pads 20, 20 can be reversely adjusted or otherwise suitably positioned, and the rotation of lever 24 would be in a clockwise direction, rather than in the illustrated counterclockwise direction.

DESCRIPTION OF MODIFIED EMBODIMENTS

Figure 3:
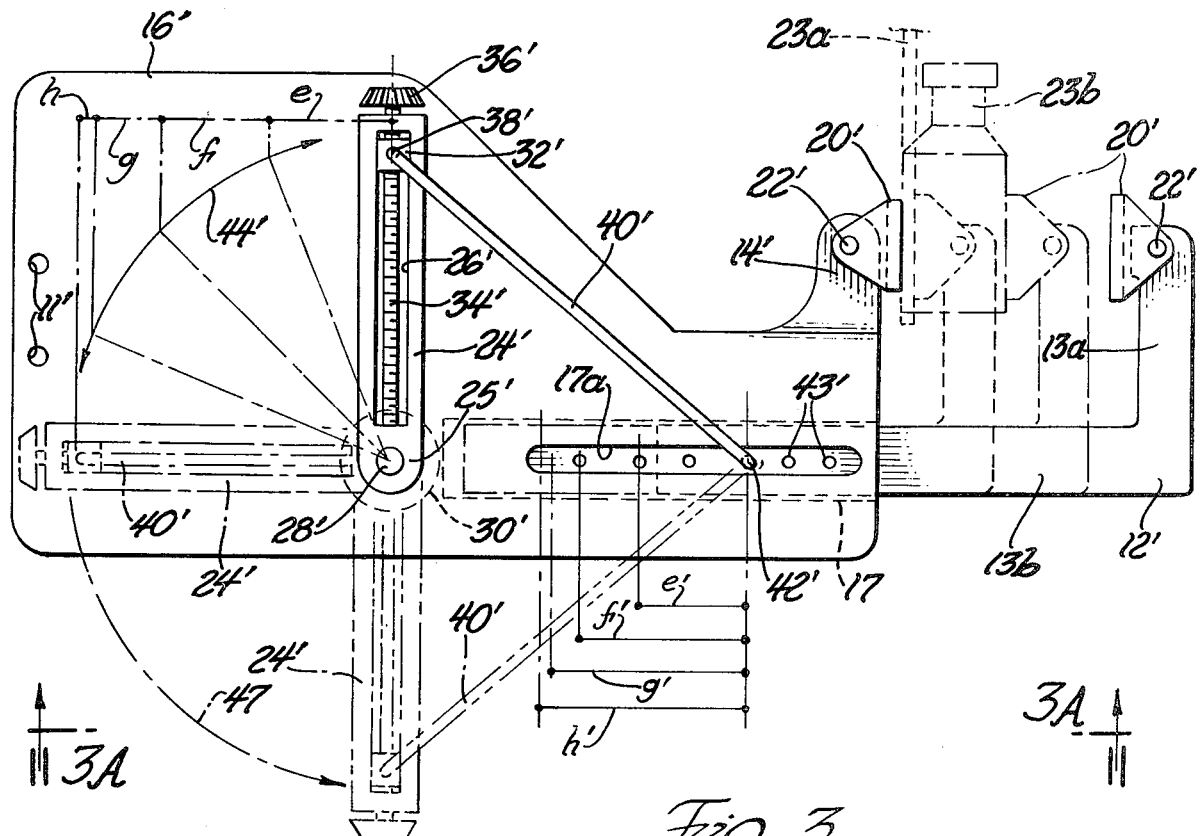
FIGS. 3 and 3A are top plan and edge elevational views respectively showing one alternative embodiment of a gripper mechanism which may be used on the arm of FIG. 1.
Figure 3A:
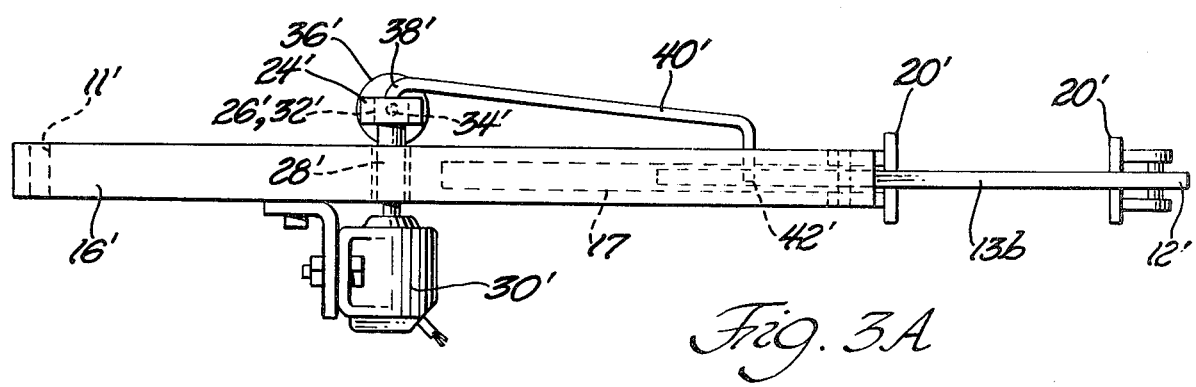

FIGS. 3 and 3A are exemplary plan and edge views of one preferred modified embodiment of my gripper mechanism using this same advantageous lever linkage arrangement. In this embodiment single primed reference numerals will be used as much as possible to identify generally the same or similar parts of those unprimed numerals described hereinabove relative to FIG. 1. Thus, gripper base plate 16' is similarly provided with bracket or plate mounting holes 11' toward one end, while the fixed arm 14' is provided toward the opposite end. In this form, the movable gripper arm 12' is of generally L-shape having a short leg 13a and a longer leg 13b. Longer leg 13b is mounted for slidable reciprocable movement within a slideway 17 which is provided in a suitable manner on or within the body of base plate 16'. The relative placement of arms 12' and 14' is such that their corresponding pivotal gripper pads 20', 20' are opposite one another, to facilitate grasping of a workpiece 23a and 23b.

Continuing relative to FIGS. 3 and 3A, lever 24' and motor 30' are constructed and mounted like their counterparts in FIG. 2, as is link member 40'. However, the pivotal connection 42' with movable arm 12', as shown, is somewhat nearer the end portion of leg 13b which is more remote from the gripper pad end of leg 13a. Additionally, base plate 16' is provided with an elongated slot 17a adjacent to and coextending with a major part of trackway or slideway 17. The width of the slot 17a is such as to freely accommodate the turned-in end of link 40' forming the pivotal connection 42'. Relative to lever 24', the adjustment screw rod 34' is shown with a finger rotatable dial 36' instead of a reversible motor.

Operation of the FIG. 3 embodiment should be readily apparent, but will be reviewed now. Upon rotation of lever 24' from its solid line position to the 90° displaced broken line position, equal arcuate travel segments of approximately 22½°, like those described relative to FIG. 1, are shown along travel arc 44', with similar corresponding linear delineations for the respective segments being designated e, f, g, and h. Movable jaw 12' is pulled by link 40' from its normally open position toward the closed position. Respective corresponding linear travel of the movable jaw is designated by the projection lines through the pivot point 42' as it progressively moves in slot 17a toward the pivot point 28' of lever 24'. These corresponding linear travel increments are designated e', f', g', and h', which graphically signify the faster initial travel of jaw 12' and the relatively slower later travel as the jaw finally closes upon the workpiece.

Continuing further relative to this FIG. 3 embodiment, release of the gripping effect may be effected either by reversing the motor 30' so that lever 24' retraces its movement back through the first traveled approximate 90°. Alternatively, motor 30' can be energized again to effect continued rotation in the same direction of lever 24' through a second 90° travel arc designated 47, which will also achieve release and return of gripping jaw or arm 12' to its fully open starting position. As illustrated here, the lever can travel only a maximum of the 180° before it must be reversed for recycle travel in the opposite respective 90° then 180° segments. Assuming that base plate 16' was of a size to accommodate a longer slot 17a, it is apparent that the mechanism could be modified to operate through full repetitive 360° cycles comprised of four 90° quadrants. Each 90° quadrant would effect either closing or opening of the movable jaw or jaws.

Figure 3B:
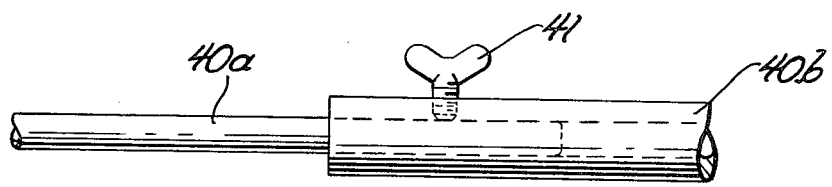
FIG. 3B is a fragmentary detail of a possible modified form of one of the levers or links showing a length adjustment feature.

FIG. 3B is a fragmentary detail view of one form of adjustment means for the previously described link member 40. More specifically, this FIG. 3B variation shows the link comprised of telescopic sections 40a and 40b with any appropriate locking means such as setscrew 41.

Figure 4:
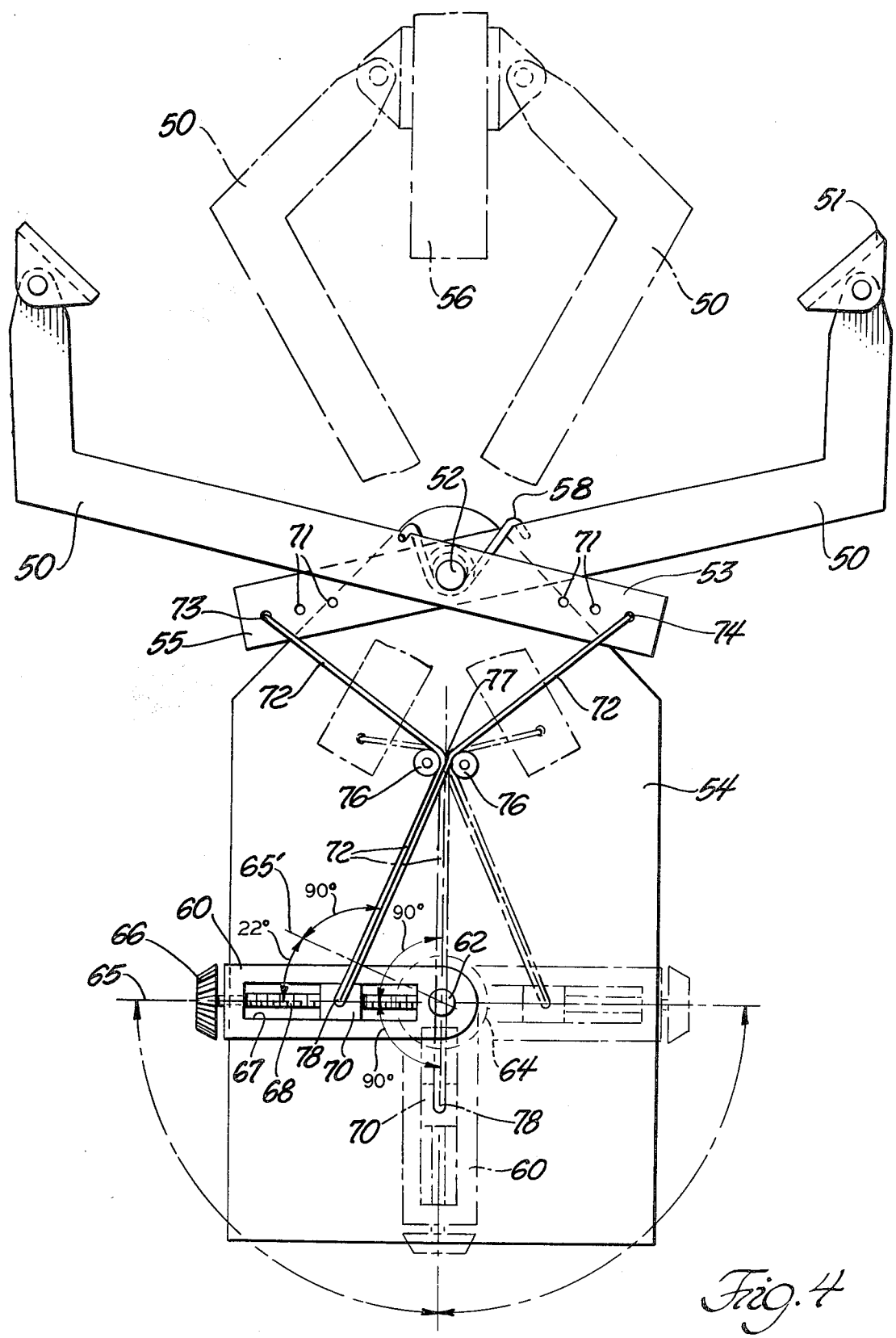
FIG. 4 is a top plan view of a modified embodiment wherein a flexible-type linkage in the form of cables is used to operate the gripper arms.

FIG. 4 depicts a modified embodiment of gripper assembly wherein both gripper arms 50, 50 are pivotably mounted at 52 on a support plate member 54, and movable in a tong-like fashion toward and away from a work article 56. It is noted that the gripper arms 50, 50, having gripper pad subassemblies 51, 51 (similar to subassemblies 20, 20 of FIG. 2), may be mounted with a suitable spring means 58 to normally bias said arms 50, 50 apart and initially hold them away from the potential workpiece or article with which it is to be associated. Depending upon the use, the gripper mechanism may be modified to effect internal gripping of articles.

This FIG. 4 assembly also includes a swingable lever 60, corresponding to the lever 24 in FIG. 2, and which lever is mounted on the shaft 62 of a reversible motor 64. Lever 60 is constructed similar to counterpart levers 24 and 24', and includes the rotatable elongated threaded shaft 68 which extends approximately the full length of the lever 60, and the adjustable nut member 70 mounted on shaft 68. Adjustable nut 70 as carried by the screw shaft 68 can be adjusted along the screw by either the illustrated manual knob 66, similar to knob or dial 36' of FIG. 3, or by a small motor like 36 in FIG. 2. While the knob 66 is shown on the outer free end of shaft 68, it is understood that it can be smaller diameter and disposed on shaft 68 but within the slot 67, and at either end thereof.

The linkage means for operating the tong-like gripper arms in this FIG. 4 embodiment is flexible in character and connects the extended actuating ends 53 and 55 of both gripper arms 50 to the adjustable nut 70. In this example, flexible cable is used as the linkage means; however, those skilled in the art will appreciate that other flexible strap or lever means which will suitably interact with the ends of the gripper arms and the associated adjustment nut and lever will suffice. The cable-type linkage 72 is doubled or is split so that separate strands are respectively connected to each of the gripper arm end portions at 73, 74 as shown. The cable-type linkage is then trained over suitable antifriction means, such as idler pulleys 76, 76 and then run closely adjacent to each other for connection with an anchorage point 78 on the nut 70. The positioning of pulleys 76, 76 is such that the confluence 77 of the cables 72, 72 is on the line projecting between the pivots 52 and 62, and also essentially is equal distant from the connection points 73 and 74 of cables 72, 72. The respective cable-adjustment holes 71 in the ends 53 and 55 of arms 50, 50 are also respectively equal distant from pivot 52. The arrangement of the gripper arms, the lever, and linkage means is such that the cable is always relatively taunt and that there is no excess slack at any time during the gripper arm stroke. Further, the midpoint between pulleys 76, and the center of shaft 62 is preferably oriented on a line common with the pivot point 52 of arms 50, 50, and with the approximate middle of the support plate 54. The overall arrangement is such that the actuating lever 60 has its centerline 65 or longitudinal length disposed generally perpendicular to the aforesaid common line of centers of shafts 52, 62 and midpoint 77 of pulleys 76, when in the illustrated arms open position. This is the solid line position of lever 60 in FIG. 4.

In this FIG. 4 configuration, when in operation the lever has a changing angular relationship to the line of action of the cable 72, and to the aforesaid centers alignment, such that the cable moves relatively further and faster during the initial approximate two-thirds downward motion. Thereafter, it moves relatively slow as it nears the end of its downward motion, as explained in the foregoing description of the other embodiments. This is advantageous by creating a smooth firm touch on the work which is desirable especially for handling fragile items.

The gripper arm's span is somewhat variable by moving the adjustment nut 70 toward or away from the lever pivot point 62, thereby enabling the grippers to grasp different sized articles. Additional adjustment may be obtained by use of the aforementioned holes 71 for the cable attachments 73, 74 in the ends 53 and 55 of arms 50, 50.

By moving the attachment nut to the right toward the lever's pivot point shaft 62, the cable type linkage will have a smaller stroke with less pull travel, thus allowing the gripper arms 50, 50 to grasp a large work article. By moving the adjustable nut to the left away from the lever pivot 62, it effectively increases the stroke or travel of each arm 50, thus the gripper span is shortened and the gripper arms more readily may grasp a smaller object.

As illustrated, for most effective operation, the lever 24, or 60, at the end of the first 90° arcuate travel, should be oriented to have its longitudinal center, together with link's connection point 38 (FIG. 2), 38' (FIG. 3) or 78 (FIG. 4), in alignment with the aligned center of the lever 24 (or 60) and the connection of opposite end of link 40 with the movable arm (point 43—FIG. 2 or point 42'—FIG. 3), or with point 77 for the FIG. 4 embodiment.

In the various embodiments, the respective motors are wired in a conventional or suitable manner (not shown) so as to be selectively operable by separate push button or equivalent controls, and may be further wired to operate in a programmed computer-operated system.

Figure 5:
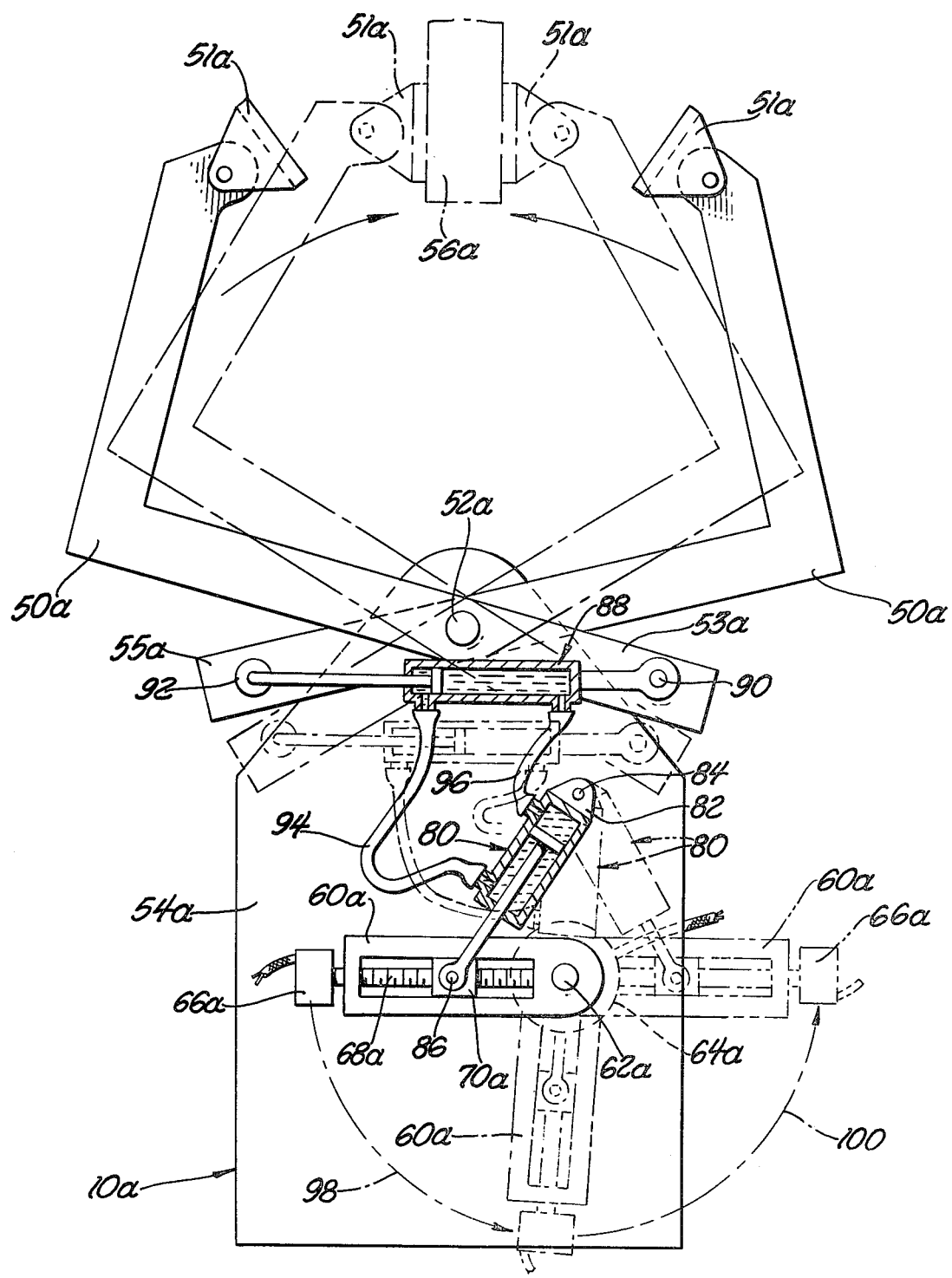
FIG. 5 is a top plan view of another modified embodiment which utilizes hydraulic operated linkage as part of its lever to operate the gripper arms.

FIG. 5 depicts another modification of gripper mechanism, similar to that shown in FIG. 4, but which utilizes hydraulic means as part of the linkage system to operate the gripper arms. In this variation of the invention, many of those parts corresponding to similar or same counterparts in the FIG. 4 embodiment are identified with the same reference number but having letter a suffixes. Thus, assembly 10a comprises the support plate 54a which pivotally supports the tong-like gripping arms 50a, 50a, having gripping pads 51a, 51a, on the pivot means 52a. Lever 60a, mounted upon motor shaft 62a of the reversible motor 64a, also has the small reversible motor 66a mounted thereon together with its associated threaded shaft 68a and adjustment nut 70a.

Continuing relative to FIG. 5, the linkage means comprises a first conventional hydraulic cylinder and piston with rod assembly 80, having a head end mounting bracket 82 for pivotally attaching it via pivot means 84 to the support plate 54a, at an intermediate area between the pivots 52a and 62a. The projecting free end of the piston rod is pivotally connected at 86 to the threaded nut member 70a. Said linkage means further comprises a second hydraulic cylinder and piston with rod assembly 88. Both the head end and rod free end are provided preferably with eyelets to facilitate their respective pivotal attachments at 90 and 92 to the respective actuating ends 53a and 55a of tong/gripper arms 50a, 50a. The length of the cylinder and rod of assembly 88 is such that when the rod is fully extended as shown in solid lines, the gripper arms 50a, 50a are held in the spaced apart, solid line condition.

The respective cylinders have the conventional inflow-outflow ports toward opposite ends thereof with flexible conduits 94, 96 to form a closed-loop hydraulic system between the respective assemblies 80 and 88. The relative sizes (diameters and lengths) of the respective cylinders and piston assemblies may vary according to the desired length of strokes, and to accommodate potential varying of the stroke and/or moment arm of the rod connected to the actuating lever 60a. While the illustrated cylinders are shown of different diameters and lengths, some embodiments may call for essentially same diameter pistons and same length cylinders. Thus, if the areas of the respective pistons are the same their pistons will each move the same distance, whereas, with the larger diameter piston in assembly 80, the piston of assembly 88 will move comparatively farther than that of assembly 80. The relationships are selected such that upon rotation of lever 60a downward through the first approximate 90° travel arc 98, the hydraulic pressure translated from the first cylinder assembly 80 causes the piston and rod of the second cylinder assembly 88 to effect contracture of the actuating ends 53a and 55a of arms 50a, 50a thereby effecting closure movement of said arms to the dotted line position to grip a workpiece 56a. It is further understood that the gripper section may be mounted in a remote position relative to the cylinder 80, connected only by said conduits 94 and 96.

It is apparent that the related wiring circuitry (not shown) may be such that the motor 64a can be reversed after the first 90° rotation to reverse the cycle and effect opening of the gripper arms. Alternatively, it may be preferred in some instances to have the wiring and linkage arms so as to enable the lever to continue to rotate on through from 90° to approximately 180° as shown by the additional travel arc 100 in FIG. 5, in which event the same effective retraction or opening of the gripper arms would be achieved during the second 90° travel arc. Then reversal of the motor and lever direction through another 90° and then 180° in the reverse direction would achieve a further gripping and release cycle of the mechanism. This also could be made applicable to the form of FIG. 3 and FIG. 4.

Although the scale of the drawings precludes showing a further alternative operation, it is to be understood that for the FIG. 4 and FIG. 5 embodiments the cylinders, or lever and linkage components can be made and arranged so that substantially the same amounts of gripper arm movement are achievable for each of the respective substantially 90° quadrants, even if the lever is progressively rotated through full repetitive 360° cyclical travel.

It is apparent from each of the foregoing embodiments, that the cyclical travel for each of the respective gripping and release cycles is approximately 90°, with the arrangement of components being such that the gripper/tong arms move more rapidly when moving from their initially full open condition, and then move progressively slower for a smooth firmer action as the gripper arms complete their closing/gripping cycle. Conversely, upon subsequent cyclical release operation, after a gradual careful release of the arms or pads, the arms then continue to open in a progressively faster manner until they reach their full open condition.

Further modified arrangements for use of the mechanisms herein are contemplated wherein the designated travel arc of the actuating lever, such as lever 60 in FIG. 4, may be substantially in excess of the aforedescribed generally 90° quadrants. For example, in FIG. 4 lever 60 may be variously disposed to more nearly position its centerline 65 in the alternate position designated 65', such that it is disposed approximately at 90° relative to the taut alignment of flexible linkage means (cable) 72. While the included angle between this latter position and its other 90° position is shown to be approximately 22°, this angular relationship may tend to vary up to approximately 45°. Thereupon the modified arc of travel of lever 60 would then also vary between the aforesaid approximate 90° and approximately 130°-135°, perhaps more generally being in the range of approximately 110°–125°, thus more nearly representing a third of an overall potential 360° cycle.

The foregoing respective, variable speed progressively faster and progressively slower movements of the gripper mechanisms are achieved notwithstanding the respective range of adjustments which can be made to alter the moment arm of the lever.

With respect to whether motor means or manual means are used to effect rotation of the threaded adjusting screw or shaft 68, it is contemplated that each form may be provided with appropriate calibration means, not shown, to obtain more accurate control for predetermined sizes of workpieces.

While the foregoing descriptions and illustrations depict some of the preferred embodiments, it is acknowledged that various other modifications and alterations may be made by those skilled in the art without departing from the spirit and scope of the invention as defined in the appended claims.

What is claimed is:

1. In a mechanism that comprises movable work-engaging arm means having a variable length stroke from a fixed start position to a variable final end position: the improvement comprising a power mechanism for operating the work-engaging arm means between its start position and its end position, said power mechanism comprising a lever having a swing axis, motor means for moving said lever through a predetermined arc around the swing axis, and a hydraulic cylinder with a piston disposed therein, said piston having a rod projecting from said cylinder, said rod having a first pivotal connection with the lever so that movement of the lever through its predetermined arc causes the piston to move within the cylinder which enables the hydraulic cylinder to effect motion of the work-engaging arm means from its start position to its end position and said pivotal connection being adjustable along the lever to positions spaced different distances from the lever swing axis, to thus vary the stroke distance traveled by the piston within the cylinder and the associated stroke distance traveled by the work-engaging arm means.

2. The improvement of claim 1 wherein the hydraulic cylinder has a second pivotal connection spaced from the first pivotal connection; the hydraulic cylinder and lever being oriented so that when the work-engaging arm means is in its start position an imaginary straight line from the lever swing axis through the first pivotal connection extends at an appreciable angle to an imaginary straight line extending between the two pivotal connections, and when the work-engaging arm means is in its final end position the lever swing axis and the two pivotal connections are substantially aligned on an imaginary straight line, whereby the arm means has a relatively fast motion during the initial stages of its movement and a relatively slow motion during the last stages of its movement.

3. The improvement of claim 1 wherein the lever moves through an arc of approximately 90° to operate the arm means from its start position to its final end position.

4. The improvement of claim 1 and further comprising means for slidably adjusting the first pivotal connection toward or away from the lever swing axis.

5. The improvement of claim 4 wherein the slidable adjusting means comprises a non-rotary nut carried by the first pivotal connection and a rotary screw mounted on the lever.

6. The improvement of claim 5 wherein the slidable adjusting means further comprises a motor mounted on the lever for effecting rotation of the screw.

7. The improvement of claim 5 wherein the slidable adjusting means further comprises a manual knob carried by the screw for effecting screw rotation.

8. The improvement of claim 1 wherein the work-engaging arm means is a jaw means adapted to apply a gripping force on the work when said arm means is in its end position.

9. The improvement of claim 1, wherein the work-engaging arm means is a jaw means adapted to apply a gripping force on the work when said arm means is in its final end position; the improvement further comprising a second hydraulic cylinder with a piston disposed therein, said piston having a rod projecting from said second cylinder, the rod being connected to said jaw means for moving same between the aforementioned end and start positions, and fluid connections between the two hydraulic cylinders for translating motion of the piston within the first hydraulic cylinder into motion of the piston within the second hydraulic cylinder.

* * * * *